United States Patent [19]
Montross

[11] 3,729,664
[45] Apr. 24, 1973

[54] HEAT SINK MOUNTING FOR THE POWER SEMICONDUCTOR IN A SOLID STATE D.C. MOTOR CONTROL CIRCUIT

[75] Inventor: Robert C. Montross, Mequon, Wis.

[73] Assignee: Square D Company, Park Ridge, Ill.

[22] Filed: Oct. 6, 1971

[21] Appl. No.: 186,843

[52] U.S. Cl.............318/139, 317/100, 317/234 A, 321/45 C
[51] Int. Cl...............................................H02p 5/16
[58] Field of Search............................318/341, 139; 321/45 C; 310/68 D; 317/100, 234 A

[56] References Cited
UNITED STATES PATENTS

| | | | |
|---|---|---|---|
| 3,363,160 | 1/1968 | Morris | 318/341 |
| 3,619,753 | 11/1971 | Thompson | 321/45 C |
| 3,562,617 | 2/1971 | Meier | 318/341 |

*Primary Examiner*—Bernard A. Gilheany
*Assistant Examiner*—Thomas Langer
*Attorney*—Harold J. Rathbun et al.

[57] ABSTRACT

A control circuit for a battery powered vehicle. The circuit includes a pair of silicon controlled rectifiers which are connected between the battery and the motor and commutated to cause the motor to be energized with pulses of current, a diode which conducts currents induced in the motor by the current pulses, a diode which conducts currents generated by the motor when the direction of current flow through the field of the motor is reversed and the motor acts as a generator and a diode which is connected in a charging circuit for a capacitor which causes the rectifiers to commutate and a heat sink which provides a common mounting and electrical junction for the pair of rectifiers and the three diodes.

10 Claims, 2 Drawing Figures

INVENTOR.
ROBERT C. MONTROSS
BY
*William H. Schmeling*

HEAT SINK MOUNTING FOR THE POWER SEMICONDUCTOR IN A SOLID STATE D.C. MOTOR CONTROL CIRCUIT

The present invention relates to a solid state circuit for controlling the energization of a direct current load from a direct current source and more particularly, to a circuit wherein a single heat sink provides a common mounting for the power conducting silicon controlled rectifiers and diodes in a circuit that controls the energization of a reversible direct current motor as may be used as a prime mover for a battery powered vehicle.

Circuits of the type disclosed in U.S. Pat. No. 3,562,617, which was granted to Roger D. Meier, are frequently installed in industrial-type electric trucks to control the energization of the direct current traction motor of the truck. As disclosed in the Meier patent, a main silicon controlled rectifier, that is connected in series with the motor, is intermittently switched to a conductive state so the motor is energized by pulses of direct current. The main rectifier is commutated from a conducting to a nonconducting state by commutating circuit that includes a capacitor, which is charged by current flowing through a diode and the main rectifier when the main rectifier is conducting, and a commutating silicon controlled rectifier that is switched to a conductive state an adjustable time interval subsequent to the instant when the main rectifier is switched to a conductive state. The circuit also includes a free wheeling diode which is connected across the series connected armature and the field of the motor to conduct currents induced in the motor during intervals between the pulses and a diode called the plugging diode which is connected across the armature of the motor to conduct currents generated by the armature when the polarity of the field flux of the motor is reversed.

Silicon controlled rectifiers designed to control large current values conventionally are sold as packaged units and most commonly have a threaded mounting stud on one end which acts as an anode connection and a braided lead at the other end which serves as the cathode connection for the rectifier unit. The mounting stud is provided so that the rectifier unit may be mounted on a metal heat sink to provide an efficient thermal connection between the rectifier unit and heat sink when the stud is threaded into a threaded opening in the heat sink. The heat sink mounting for the rectifier package is required to dissipate the heat generated within the rectifier unit by the currents flowing through the rectifier unit. Similarly, diodes which are designed to control the direction of flow of large currents, are furnished as packaged units having a mounting stud on one end and a braided lead on the other end of the diode unit. However, in the case of diode units, the mounting stud may be either the anode or the cathode of the diode unit. The mounting stud on the diode unit also provides a convenient mounting and an efficient thermal connection between the diode unit and a metal heat sink when the stud is threaded into a threaded opening in the heat sink so that the heat generated by currents flowing through the diode unit is efficiently dissipated by the heat sink. Thus heat sinks providing a mounting for a silicon controlled rectifier unit will be at the same circuit potential as the anode of the rectifier unit and heat sinks providing a mounting for a diode unit will be at the potential of the anode or cathode of the diode depending on the type of diode unit that is mounted on the heat sink. Because of the manner in which the diodes and rectifiers are connected in the motor circuit in the Meier patent, at least three individual major heat sinks are required to dissipate the heat generated in the semiconductor devices. The three heat sinks are electrically insulated from each other and from the metal panel on the truck which provides a mounting for the heat sinks.

In contrast, in the circuit according to the present invention, a single heat sink provides a common mounting for the main rectifier, the commutating rectifier, the free wheeling diode, the plugging diode and the diode which controls the direction of charging current flow for the commutating capacitor.

It is an object of the present invention to reduce the space requirements of a solid state control circuit for a direct current traction motor.

Another object is to reduce the cost and space requirements of a solid state control circuit for a direct current motor by reducing the number of heat sinks in the circuit.

A further object is to arrange the components in a solid state control circuit for a series wound direct current motor so that all the power conducting semiconductors in the circuit may be mounted on a single heat sink to provide a more compact, and economic control circuit which has an improved heat transfer capability.

Further objects and features of the invention will be readily apparent to those skilled in the art from the specification and appended drawing illustrating a preferred embodiment in which.

Figure 1:
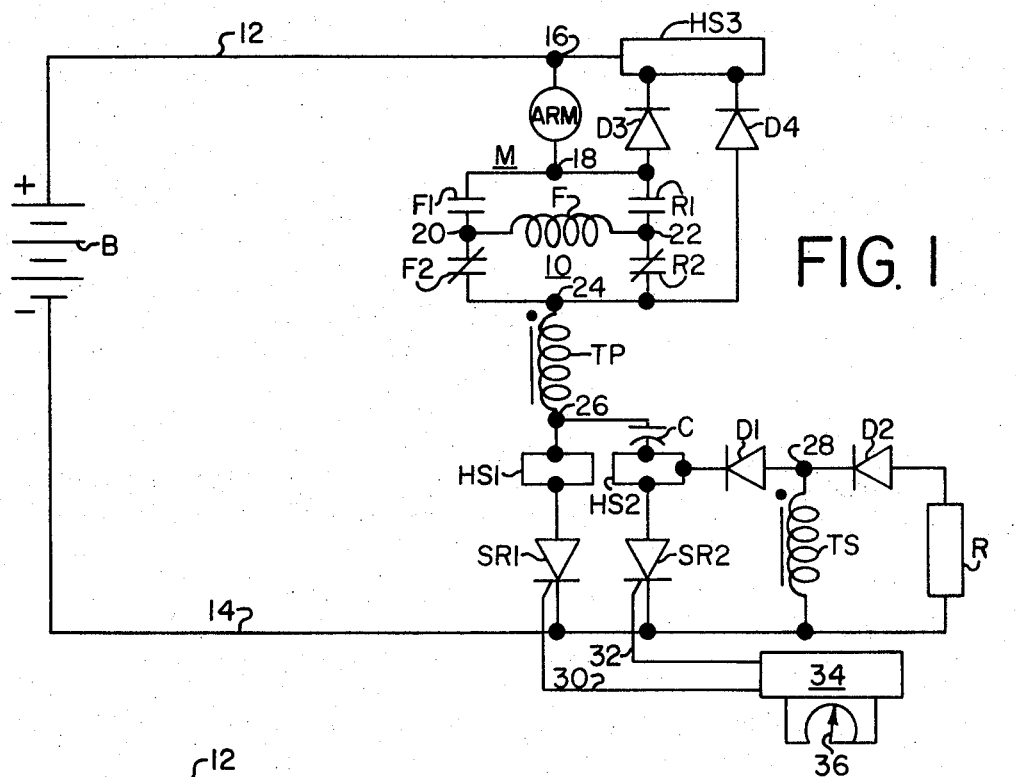
FIG. 1 is a schematic diagram of a simplified form of a typical solid state control circuit for a series wound direct current motor, according to the prior art, which is particularly suited for use in a battery powered vehicle.

The circuit shown in FIG. 1 is particularly suited for controlling the energization of a series wound direct current motor M having an armature ARM and a series field F. The motor M serves as a traction motor for a vehicle that has a directional and speed control master switch, not shown. The field F is connected in a conventional reversing circuit 10 that includes a pair of normally open contacts F1 and R1 and a pair of normally closed contacts F2 and R2. The contacts F1 and F2 are part of an electromagnetically operated device, not shown, which is energized when the master switch is operated to cause the motor M to rotate in a forward direction to cause the contacts F1 to close and the contacts F2 to open. Similarly, the contacts R1 and R2 are a part of an electromagnetically operated device, not shown, which is energized when the master switch is operated to cause the motor M to rotate in the reverse direction to cause the contacts R1 to close and the contacts R2 to open.

The circuit includes a battery B having its positive side connected to a lead 12 and its negative side connected to a lead 14. The armature ARM is connected between a junction 16 in the lead 12 and a junction 18 in the reversing circuit 10. The field F is connected between a junction 20 located between the contacts F1 and F2 and a junction 22 located between the contacts R1 and R2. A transformer has a primary winding TP connected between a junction 24 in the reversing circuit 10 and a junction 26. A secondary winding TS of the transformer is connected between the lead 14 and a junction 28 that is located between the anode of a diode D1 and the cathode of a diode D2. The diode D2 has its anode connected through a resistor R to the lead 14. The diode D1 has its cathode mounted on a heat sink HS2 which is connected through a capacitor C to the junction 26. The heat sink HS2 provides a mounting for the anode of a silicon controlled rectifier SR2. The junction 26 is also electrically connected to a heat sink HS1 which provides a mounting for the anode of a silicon controlled rectifier SR1. The rectifiers SR1 and SR2 have their cathodes connected to the lead 14 and respectively have their gate electrodes connected through leads 30 and 32 to receive firing signals from a suitable control circuit module 34 which causes the rectifiers to be switched into their conductive states at spaced time intervals as dictated by the circuitry within the module 34 in response to the setting of a speed control potentiometer 36.

The junction 16 is electrically connected to a heat sink HS3 which provides a mounting for the cathodes of a pair of diodes D3 and D4. The diodes D3 and D4 respectively have their anodes connected to the junction 18 and the junction 24.

The armature ARM is caused to rotate in either the forward or reverse direction by selective operation of a master switch, not shown, which causes the contacts F1 and F2 to respectively close and open if the armature ARM is to rotate in the forward direction and the contacts R1 and R2 to respectively close and open if the armature ARM is to rotate in the reverse direction. The operation of the master switch will also provide a suitable input signal to the control circuit module 34 which will control the energization of the motor M in response to the adjustment of the speed controlling potentiometer 36. The control 34 supplies output signals to the leads 30 and 32 which will control the energization of the motor M in response to the adjustment of the speed controlling adjustable resistor 36. The control 34 supplies an ON output signal to the lead 30 at spaced time intervals and an OFF signal to the lead 32 at an adjustable time interval, as dependent on the adjustment of the resistor 36, after each ON signal. When the contacts F1 or R1 are closed, the ON signal on the lead 30 will switch the rectifier SR1 into a conductive state and the OFF signal on the lead 32 will switch the rectifier SR2 into its conductive state.

If the contacts F1 and R2 are closed and the contacts F2 and R1 are open, the motor M will be energized to rotate in a forward direction as follows. The switching of the rectifier SR1 to a conductive state in response to an ON signal completes an energizing circuit for the armature ARM and the field F from the battery B which includes the lead 12, the armature ARM, the closed contacts F1, the field F, the closed contacts R2, the primary winding TP, the conducting controlled rectifier SR1 and the lead 14. The rectifier SR1 remains conducting after the ON firing signal from the control 34 is removed as it is connected across a direct current source supplied by the battery B. The secondary winding TS, in response to the current flow in the primary winding TP, provides an output current which is conducted by a diode D1 in a direction to charge a capacitor C making the side of the capacitor C which is connected to the anode of the rectifier SR2 positive in polarity. The charging current path for the capacitor C includes the conducting rectifier SR1. The output of the transformer secondary winding TS ceases when the iron core of the transformer saturates. A short time interval after the rectifier SR1 has switched to a conductive state, the control 34 supplies an OFF signal through the lead 32 which causes the rectifier SR2 to switch to a conductive state.

The conducting rectifier SR2 completes a discharge path for the capacitor C which discharges through the conducting rectifier SR2 and causes the rectifier SR1 to switch to a nonconductive state. After the rectifier SR1 is switched to a nonconducting state, any charge remaining on the capacitor C is discharged through the energizing circuit for the armature ARM and field F. The control 34 is arranged to periodically switch to an ON state at a constant frequency and to switch from an ON state to an OFF state an adjustable time interval after it has switched to an ON state. Thus the motor field F and the armature ARM windings will be energized by pulses of current of varying width dependent upon the output signals from the control 34.

The diode D4 conducts during the intervals between the pulses of current to the motor M because of the inductive nature of the armature and field windings of the motor. The diode D3 conducts during a plugging operation of the motor M when the direction of field excitation of the motor M is reversed and the motor M acts as a generator.

The diode D2 and the resistor R act as a reset diode and resistor in the circuit and conduct currents induced in the secondary winding TS which flow in a direction which desaturates the transformer when the commutating current through the transformer primary TP is interrupted by the switching of the rectifier SR1 to its nonconductive state.

The three heat sinks HS1, HS2 and HS3 are required in the circuit shown in FIG. 1 because of the differences in potentials of the anodes of the diodes D3 and D4 and the rectifiers SR1 and SR2 when the capacitor C is charged and the motor M is supplied with pulses of current. During periods when the motor M is supplied with current, the potential of the heat sink HS1 will be substantially equal to the potential of the lead 14. The potential of the heat sink HS2 will be positive relative to the heat sink HS1 because of the charge on the capacitor C and the potential of the heat sink HS3 will be the same as the potential on the lead 12. In this connection it should be noted that function of the heat sink HS3 cannot be combined with the heat sink HS1 by mounting the anodes of the diodes D3 and D4 on the heat sink HS1 because of the impedance across the primary winding TP.

Figure 2:
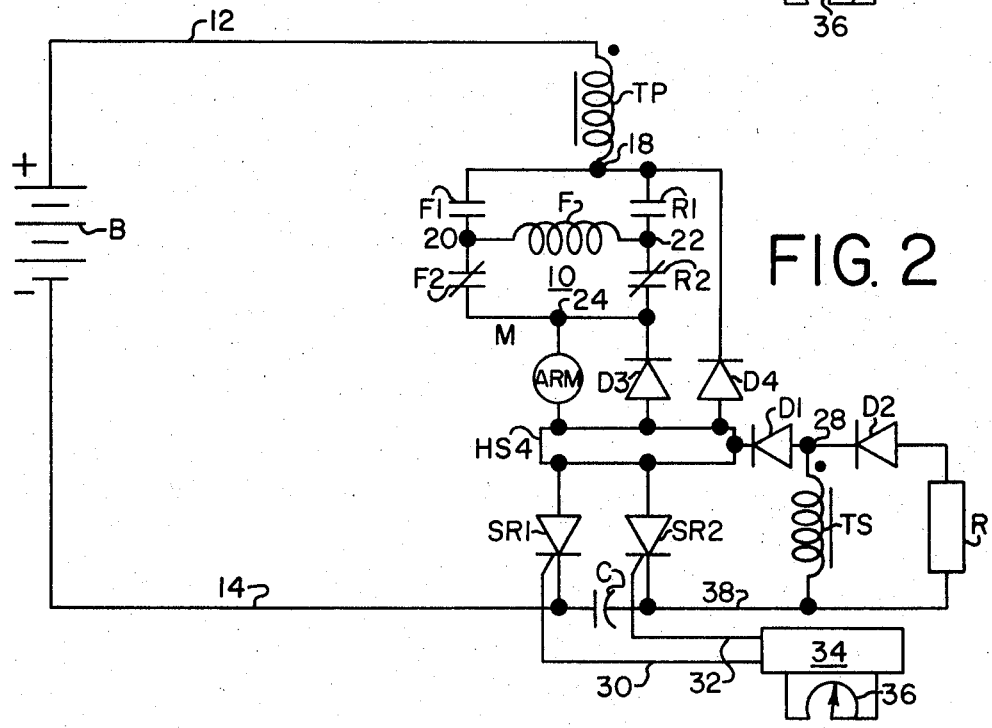
FIG. 2 is a schematic diagram showing a solid state motor control circuit incorporating the features of the present invention.

In FIG. 2 the components in the circuit shown in FIG. 1 are rearranged so that a single heat sink HS4 replaces the three heat sinks HS1, HS2 and HS3 which are required in the circuit in FIG. 1. As all of the other components of the circuits in FIGS. 1 and 2 are identical, the designations used to describe the components in the circuit in FIG. 1 will be used to describe the components in the circuit in FIG. 2. In FIG. 2 the battery B has its positive side connected to the lead 12 and its negative side connected to the lead 14. The primary winding TP is connected between the lead 12 and the junction 18 in the reversing circuit 10. The reversing circuit includes the normally open contacts F1 and R1, the normally closed contacts F2 and R2, the field winding F of the motor M, and the junctions 18, 20, 22 and 24. The armature ARM of the motor M has one of its terminals connected to the junction 24 and its other terminal connected to the heat sink HS4. The diodes D3 and D4 have their anodes connected to the heat sink HS4 and their cathodes respectively connected to the junctions 24 and 18. In FIG. 1 the cathodes of the rectifiers SR1 and SR2 are connected to the lead 14 and the capacitor C is connected between the anodes of the rectifiers SR1 and SR2. In contrast, in FIG. 2 the anodes of the rectifiers SR1 and SR2 are connected to the heat sink HS4 and the capacitor C is connected between the cathodes of the rectifiers SR1 and SR2 with the rectifier SR1 having its cathode connected to one side of the capacitor C and the lead 14 and the rectifier SR2 having its cathode connected to the other side of the capacitor C and a lead 38. The gates of the rectifiers SR1 and SR2 respectively receive input signals through the leads 30 and 32 from the control module 34 which is controlled by the adjustable resistor 36. The secondary winding TS is connected between the lead 38 and the junction 28. The diode D1 has its cathode connected to the heat sink HS4 and its anode connected to the junction 28. The diode D2 has its cathode connected to the junction 28 and its anode connected through the resistor R to the lead 38.

In FIG. 2, the contacts F1, F2, R1 and R2 control the direction of rotation of the motor and the control module 34 controls the switching of the rectifiers SR1 and SR2 in the same manner as described in the circuit in FIG. 1. When the contacts F1 and R2 are closed, current will flow from the junction 20 through the field F to the junction 22 in a direction which will cause the motor M to rotate in a forward direction. When the contacts R1 and F2 are closed, the field F will be energized by current that flows from the junction 22 to the junction 20 and the motor M will rotate in the reverse direction.

If the contacts F1 and R2 are closed to cause the motor M to rotate in a forward direction, the switching of the rectifier SR1 to a conductive state in response to an ON signal completes an energizing circuit for the armature ARM and the field F from the battery B which includes the lead 12, the primary winding TP, the closed contacts F1, the field F, the closed contacts R2, the armature ARM, the conducting rectifier SR1 and the lead 14. The rectifier SR1 remains conducting after the ON firing signal from the control 34 disappears as it is connected across the direct current source supplied by the battery B.

The secondary winding TS, in response to the current flow in the primary winding TP, provides an output current which is conducted by the diode D1 in a direction which charges the capacitor C making the side of the capacitor C which is connected to the cathode of the rectifier SR1, positive in polarity. The charging current path for the capacitor C includes the junction 28, the diode D1, the heat sink HS4, the conducting rectifier SR1, the capacitor C and the lead 38. The output of the transformer secondary winding TS ceases when the iron core of the transformer saturates. A short interval after the rectifier SR1 has switched to a conductive state, the control 34 supplies an OFF signal through the lead 32 which causes the rectifier SR2 to switch to a conductive state.

The conducting rectifier SR2 completes a discharge path for the capacitor C which discharges through the conducting rectifier SR2 and causes the rectifier SR1 to switch to a nonconductive state. After the rectifier SR1 is switched to a nonconducting state, any charge remaining on the capacitor C is discharged through the energizing circuit for the armature ARM and field F. The control 34 is arranged to periodically switch to an ON state at a constant frequency and to switch from an ON state to an OFF state an adjustable time interval after it has switched to an ON state. Thus the motor field F and the armature ARM windings will be energized by pulses of current of varying width dependent upon the output signals from the control 34.

The diode D4 conducts during the intervals between the pulses of current to the motor M because of the inductive nature of the armature ARM and field winding F of the motor M. The diode D3 conducts during a plugging operation of the motor M when the direction of field excitation of the motor M is reversed and the motor M acts as a generator.

The diode D2 and the resistor R act as a reset diode and resistor in the circuit and conduct currents induced in the secondary winding TS which flow in a direction which desaturates the transformer when the commutating current through the transformer primary TP is interrupted by the switching of the rectifier SR2 to its nonconductive state.

When the circuit shown in FIG. 2 is installed in a battery powered vehicle, the heat sink HS4 may serve as a mounting panel for all of the components used in the control system providing the heat sink HS4 is electrically insulated from the vehicle frame on which the heat sink HS4 is mounted. The common mounting for all the components in the control system will decrease the space requirements of the system and provide a more efficient cooling system for the diodes and rectifiers which are mounted on the heat sink. The common mounting permits the diodes and the rectifiers to share the heat transfer capability of the heat sink. While the area of the heat sink HS4 is required to be larger than the area of any of the individual heat sinks HS1-3, its area may be smaller than the sum of the areas of the heat sinks HS1-3 and the spacings therebetween. The heat sinks HS1-3 must be designed to dissipate the heat generated when the respective rectifiers and diodes which are mounted thereon are conducting at their maximum. However, because the circuit operates so that all of the semiconductor devices mounted on the heat sink HS4 never conduct simultaneously at their maximum, the area of the heat sink HS-4 may be smaller than the sum of the areas of the heat sinks HS1-3.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What I claim is:

1. A circuit for controlling the energization of an armature and a field of a direct current motor from a direct current source comprising: means including a pair of silicon controlled rectifiers with each rectifier having a pair of main electrodes connected in a circuit between the source and the motor for causing the source to supply the motor with spaced pulses of energizing current, means including a first diode having a pair of electrodes connected across the field and the armature for conducting currents induced in the armature during intervals between said pulses, and a metal heat sink providing a common mounting for the pair of rectifiers and the diode and providing a common electrical junction for an input terminal of the motor and a first main electrode of each of the rectifiers and a first of the pair of electrodes of the diode.

2. The circuit as recited in claim 1 including means connected in the circuit between the source and the motor for selectively causing the armature to rotate in either of two directions when the motor is energized by the current pulses and a means including a second diode mounted on the heat sink, said second diode having a pair of main electrodes connected across the motor armature for conducting currents generated by the motor when the direction of rotation is reversed and having one of its main electrodes electrically connected to the heat sink.

3. The circuit as recited in claim 2 wherein the said one main electrodes are the anode electrodes of the respective rectifiers and the first and the second diodes.

4. The circuit as recited in claim 3 wherein the means for causing the source to supply the motor with pulses of energizing current includes a third diode that is mounted on the heat sink, said third diode having a main electrode connected to the heat sink.

5. The circuit as recited in claim 4 wherein the main electrode of the third diode is the cathode of the third diode.

6. The circuit as recited in claim 1 wherein each silicon controlled rectifier has a second main electrode and the means for causing the source to supply the motor with pulses of energizing current includes a capacitor that is connected between the second electrodes of the pair of silicon controlled rectifiers.

7. The circuit as recited in claim 5 wherein each silicon controlled rectifier has a second main electrode and the means for causing the source to supply the motor with pulses of energizing current includes a capacitor that is connected between the second electrodes of the pair of silicon controlled rectifiers.

8. The circuit as recited in claim 7 including a transformer, said transformer having a primary winding connected in the circuit between the source and the motor and a secondary winding connected in a circuit including the third diode, the heat sink, one of said pair of rectifiers and the capacitor.

9. The circuit as recited in claim 1 wherein the motor is a series wound direct current motor.

10. The circuit as recited in claim 9 wherein the armature has one of its input terminals connected to the heat sink.

* * * * *